United States Patent
Oda

(10) Patent No.: US 8,039,798 B2
(45) Date of Patent: Oct. 18, 2011

(54) DUAL-WAVELENGTH THERMAL INFRARED SENSOR

(75) Inventor: Naoki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 12/496,164

(22) Filed: Jul. 1, 2009

(65) Prior Publication Data

US 2010/0006757 A1    Jan. 14, 2010

(30) Foreign Application Priority Data

Jul. 8, 2008   (JP) .................... 2008-178283

(51) Int. Cl.
   *G01J 5/00*      (2006.01)
(52) U.S. Cl. .................................. 250/338.1
(58) Field of Classification Search .... 250/338.1–338.5, 250/339.1, 330–335, 339.01–339.15, 341.1–341.8
   See application file for complete search history.

(56) References Cited

U.S. PATENT DOCUMENTS 6,495,829 B1 * 12/2002 Oda ................... 250/339.02
2003/0116711 A1 * 6/2003 Hara et al. ............ 250/338.1

FOREIGN PATENT DOCUMENTS

JP             3597069 B    9/2004

* cited by examiner

*Primary Examiner* — David P. Porta
*Assistant Examiner* — Kiho Kim

(57) ABSTRACT

A dual-wavelength thermal infrared sensor includes a first and a second type pixels that detect infrared in different wavelength ranges. The pixels of both types include a diaphragm supported by beams, an eave formed to spread outward from the diaphragm, and reflection film on the substrate. The diaphragm includes a thermoelectric conversion material thin film, an electrode, and protective films. The protective films and eaves are made of a material having larger absorption coefficient for infrared in the first wavelength range and a smaller absorption coefficient for infrared in second wavelength range. First-type pixels further have metal thin films formed on the top of the diaphragm and eaves. First-type pixels have sensitivity to infrared in a first wavelength range and in a second wavelength range defined by optical interference occurring between the metal thin films and the reflection film. Second-type pixels have sensitivity to first wavelength range infrared.

5 Claims, 8 Drawing Sheets

PIXEL OF FIRST TYPE (sectionA-A')

PIXEL OF SECOND TYPE (sectionB-B')

PIXEL OF FIRST TYPE

PIXEL OF SECOND TYPE

PIXEL OF FIRST TYPE (section A-A')

PIXEL OF SECOND TYPE (section B-B')

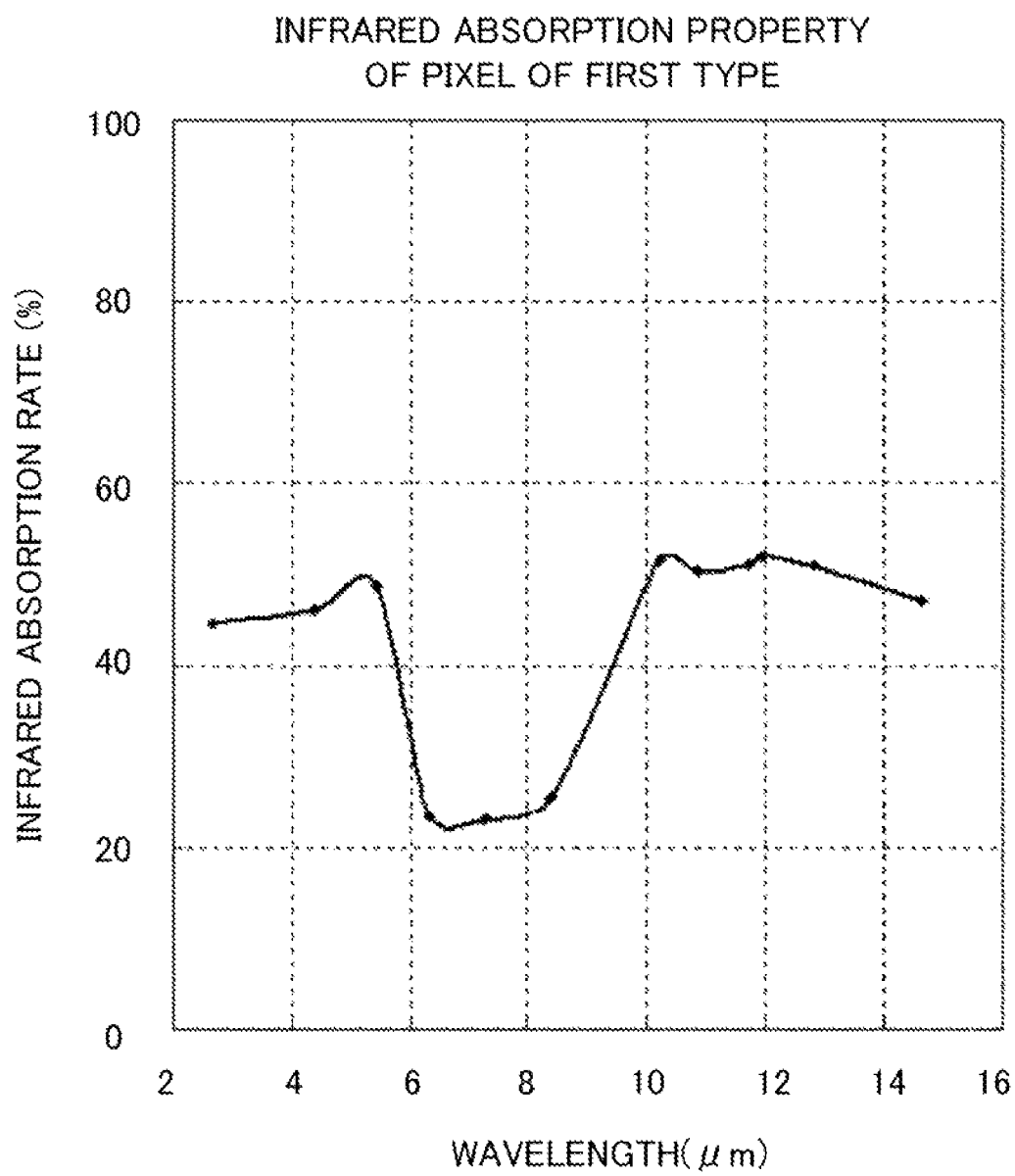

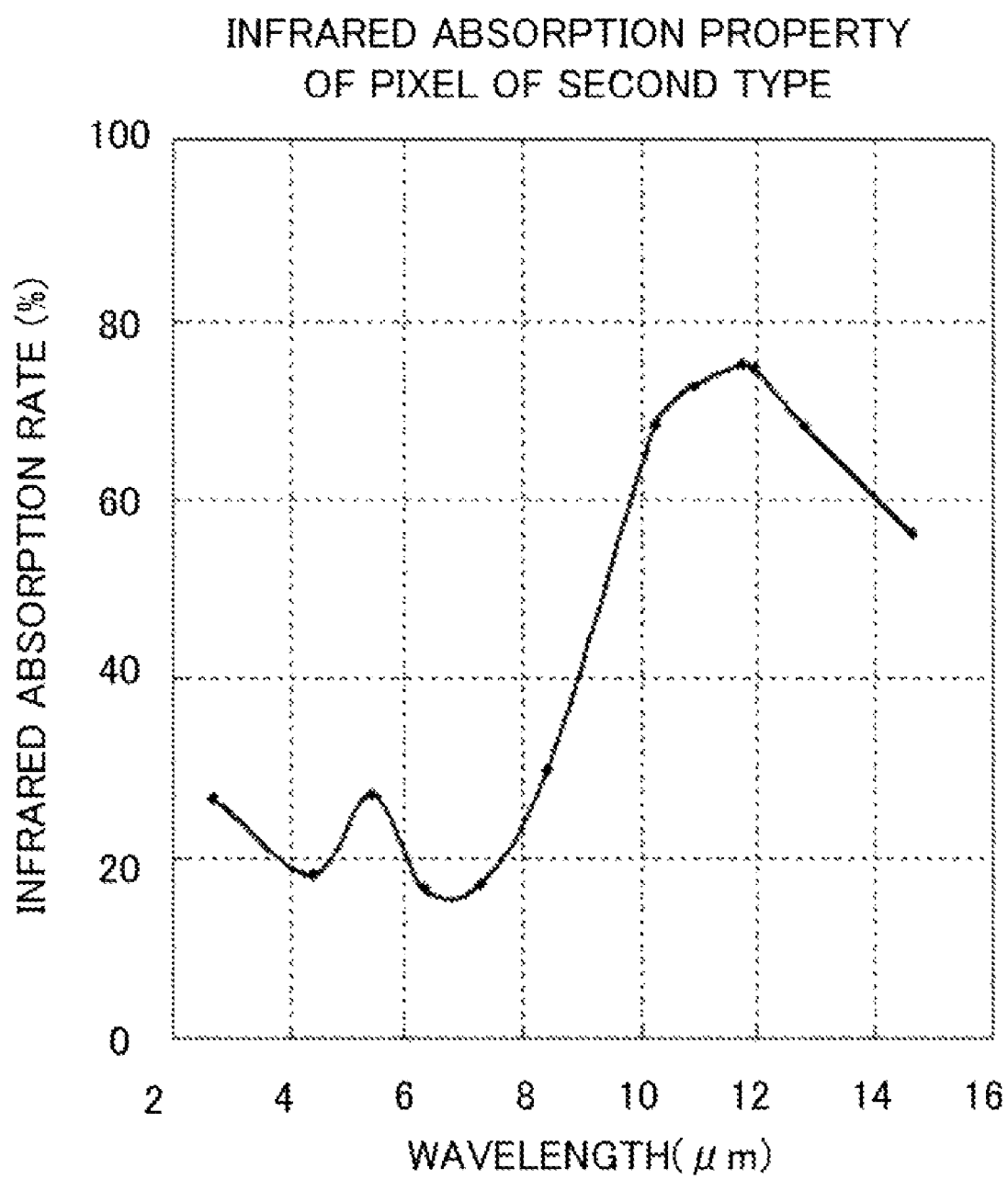

FIG.4

| ORDER m | WAVELENGTH λ1 (μm) | WAVELENGTH λ2 (μm) |
|---|---|---|
| 1 | 18 | 9 |
| 2 | 9 | 4.5 |
| 3 | 6 | 3 |
| 4 | 4.5 | 2.25 |
| 5 | 3.6 | 1.8 |
| 6 | 3 | 1.5 |
| 7 | 2.6 | 1.3 |

(sectionA-A')  (sectionB-B')

(sectionA-A')  (sectionB-B')

(sectionA-A')  (sectionB-B')

(sectionA-A')  (sectionB-B')

DUAL-WAVELENGTH THERMAL INFRARED SENSOR

This application is based on Japanese Patent Application No. 2008-178283 filed on Jul. 8, 2008 and including specification, claims, drawings and summary. The disclosure of the above Japanese Patent Application is incorporated herein by reference in its entirety.

TECHNICAL FIELD

The present invention relates to a thermal infrared sensor, and particularly to a configuration of a dual-wavelength thermal infrared sensor, which enables one sensing device to detect two infrared wavelength ranges.

BACKGROUND ART

Japanese Patent No. 3597069, titled "Thermal Infrared Array Sensor for Detecting Plurality of Infrared Wavelength Band", describes a dual-wavelength uncooled thermal infrared array sensor. FIG. 5 to FIG. 9 show examples of the sensor described therein. FIG. 5 is an exemplary perspective diagram of a bolometer-type infrared array sensor that detects two infrared wavelength ranges, where two types of pixels that constitute the array are exemplarily shown.

According to the examples described in Japanese Patent No. 3597069, the thermal infrared array sensor that detects two infrared wavelength ranges is, as shown in FIG. 5, formed of a Si readout integrated circuit substrate 4 that has a readout integrated circuit and a perfect reflection film, and an upper layer member having a thermal insulation structure constituted by a diaphragm 2 that is supported by a beam 3 extending from the Si readout integrated circuit substrate 4 to have a gap from the substrate 4. It is possible to make such a thermal infrared array sensor capable of detecting infrared rays of different wavelength ranges, by using different multilayer structures or different thin film materials for the diaphragms 2 of adjoining pixels, or by varying from pixel to pixel the interval between the upper layer member and the perfect reflection film on the Si readout integrated circuit substrate 4.

FIG. 6 shows the first example described in Japanese Patent No. 3597069. The diaphragm 102 of a pixel is formed of a bolometer material thin film 105 made of vanadium oxide transmissive to infrared, and protective films 106 or protective films 107.

The protective films 106 of the pixel of the section A-A' are SiN films and absorb infrared rays in the wavelength range of 8 to 14 µm. A high infrared absorption rate is achieved by the perfect reflection film 108 on the Si readout integrated circuit substrate 109 reflecting an incident infrared ray 1 toward the diaphragm 102.

In this case, the cavity 110 may have any dimension as long as the diaphragm 2 is separate from the perfect reflection film 108. Meanwhile, the protective films 107 of the other pixel shown by the section B-B' are made of $SiO_2$, which is almost transmissive to infrared. In order for infrared to be absorbed, an infrared absorptive thin film 111, which is impedance-matched to the vacuum, is formed on the upper surface of the diaphragm. The interval between the infrared absorptive thin film 111 and the perfect reflection film 108 is adjusted to 1 µm optically, such that infrared rays in the wavelength range of 3 to 5 µm are mainly absorbed into the infrared absorptive thin film 111 due to an optical interference that occurs between the infrared absorptive thin film 111 and the perfect reflection film 108.

Infrared rays absorbed in this manner are transformed to heat and change the temperature of the diaphragm. This in turn changes the resistance of the bolometer inside the diaphragm, and the resistance change is converted into an electric signal, which is signal-processed and turned into an image. It is possible to detect infrared rays in two wavelength ranges by forming an infrared array sensor by disposing pixels of the A-A' section and of the B-B' section in a desired arrangement or giving pixels of the B-B' section different cavity lengths.

FIG. 7 shows the second example described in Japanese Patent No. 3597069. The diaphragm 112 of a pixel is formed of a bolometer material thin film 113 made of vanadium oxide transmissive to infrared, and protective films 114 or protective films 115. The protective films 114 and the protective films 115 are made of $SiO_2$ that is almost transmissive to infrared.

An infrared absorptive thin film 117, which is impedance-matched to the vacuum, is formed on the upper surface of the diaphragm. In the pixel of the section A-A', the interval between the infrared absorptive thin film 117 and the perfect reflection film 116 is adjusted to approximately 2.5 µm optically such that infrared rays in the wavelength range of 8 to 14 µm are absorbed due to an optical interference that occurs between the infrared absorptive thin film 117 and the perfect reflection film 116. Actually, the thickness of the $SiO_2$ protective films is 500 nm and the cavity length (the dimension of the cavity 119) is 1.8 µm. Meanwhile, in the pixel of the section B-B', the interval between the infrared absorptive thin film 117 and the perfect reflection film 116 is adjusted to approximately 1 µm optically such that infrared rays in the wavelength range of 3 to 5 µm are mainly absorbed. Actually, the thickness of the $SiO_2$ protective films is 500 nm and the cavity length (the dimension of the cavity 120) is 0.3 µm.

It is possible to detect infrared rays in two wavelength ranges by forming an infrared array sensor by disposing sensors having different cavity lengths in a desired arrangement.

FIG. 8 shows the third example described in Japanese Patent No. 3597069. The diaphragm 121 of a pixel is formed of a metal bolometer material thin film 122 made of a metal thin film such as that of Ti having a thickness of 100 nm and infrared-reflective, a protective film 123 or a protective film 124, and a protective film 125. The protective film 123 and the protective film 124 are made of $SiO_2$ that is almost transmissive to infrared.

An infrared absorptive thin film 126, which is impedance-matched to the vacuum, is formed on the upper surface of the diaphragm 121. In the pixel of the section A-A', the thickness of the protective film 123 on the metal bolometer material thin film 122 is adjusted to approximately 2.5 µm optically such that infrared rays in the wavelength range of 8 to 14 µm are absorbed due to an optical interference that occurs between the infrared absorptive thin film 126 and the metal bolometer material thin film 122. Actually, the thickness of the $SiO_2$ protective film is 1.6 µm. Meanwhile, in the pixel of the section B-B', the thickness of the protective film 124 is adjusted to 1 µm optically such that infrared rays in the wavelength range of 3 to 5 µm are mainly absorbed. The thickness of the $SiO_2$ protective film is 0.6 µm.

In this manner, it is possible to detect infrared rays in two wavelength ranges by forming an infrared array sensor by disposing, in a desired arrangement, sensors whose protective film, which is between the infrared absorptive thin film and the metal bolometer material thin film, has a thickness different from that of the protective film of other sensors.

FIG. 9 shows the fourth example described in Japanese Patent No. 3597069. As well as the third example, the diaphragm 130 of a pixel is formed of a metal bolometer material thin film 131 made of a metal thin film such as that of Ti and infrared-reflective. However, the difference lies in the combination of the material of the upper protective film of the diaphragm 130 and the infrared absorptive thin film. The diaphragm 130 of a pixel is formed of the metal bolometer material thin film 131 having a thickness of 100 nm and being infrared-reflective, and a protective film 132 or a protective film 133, and a protective film 135.

In the pixel of the section A-A', the protective film 132 is a SiN film that absorbs infrared rays in the wavelength range of 8 to 14 μm. A high infrared absorption rate is achieved by the metal bolometer material thin film 131 reflecting an incident infrared ray 1 toward the protective film 132. Meanwhile, in the pixel of the section B-B', the protective film 133 is made of $SiO_2$ that is almost transmissive to infrared. An infrared absorptive thin film 134, which is impedance-matched to the vacuum, is formed on the upper surface of the diaphragm 130. The interval between the infrared absorptive thin film 134 and the metal bolometer material thin film 131 is adjusted to 1 μm optically such that infrared rays in the wavelength range of 3 to 5 μm are mainly absorbed due to an optical interference that occurs between the infrared absorptive thin film 134 and the metal bolometer material thin film 131. The thickness of the $SiO_2$ protective film is 0.7 μm. Note that in this example, it does not matter whether the protective film 135 beneath the metal bolometer material thin film 131 is made of SiN or $SiO_2$. The dimension of the cavity 136 may be any as long as the diaphragm 130 is separate from the Si readout integrated circuit substrate 137.

In this manner, it is possible to detect infrared rays in two wavelength ranges, by forming an infrared array sensor by disposing, in a desired arrangement, pixels having no infrared absorptive thin film but using an infrared absorptive protective film and pixels in which a metal bolometer material thin film and an infrared absorptive thin film are combined.

SUMMARY

An exemplary object of the present invention is to provide a thermal infrared sensor that can detect infrared rays in two wavelength ranges and that are not subject to different stresses due to the protective films and the cavity length of two types of pixels.

To achieve the above object, a dual-wavelength thermal infrared sensor according to the present invention is a thermal infrared sensor that has a thermal insulation structure and includes a plurality of pixels that detect incident infrared rays. The plurality of pixels include pixels of a first type and pixels of a second type that detect infrared rays in different wavelength ranges. The pixel of the first type and the pixel of the second type each include a diaphragm that is supported by beams extending from a substrate to have a gap from the substrate; an eave that is formed to spread outward from the diaphragm; and a reflection film that substantially reflects infrared rays and exists on the substrate immediately beneath the diaphragm. The diagraph includes: a thermoelectric conversion material thin film that is substantially transmissive to infrared rays; an electrode that catches a change of a physicality of the thermoelectric conversion material thin film; and protective films that enclose the thermoelectric conversion material thin film and the electrode. The protective films of the diaphragm and the eave are made of a material that has a relatively large absorption coefficient for infrared rays in a first wavelength range and a relatively small absorption coefficient for infrared rays in a second wavelength range different from the first wavelength range. The pixel of the first type further includes metal thin films that are formed on the upper surface of the diaphragm and the upper surface of the eaves respectively. The pixel of the first type has sensitivity to infrared rays in the first wavelength range that are absorbed by the protective films and the eave, and to infrared rays in the second wavelength range that is defined by an optical interference that occurs between the metal thin films and the reflection film. The pixel of the second type has sensitivity to infrared rays in the first wavelength range that are absorbed by the protective films and the eave.

BRIEF DESCRIPTION OF THE DRAWINGS

These objects and other objects and advantages of the present invention will become more apparent upon reading of the following detailed description and the accompanying drawings in which:

FIG. 3A shows the absorption property or the sensitivity of a pixel of FIG. 1A, of pixels of two types used in a dual-wavelength thermal infrared sensor according to one example;

FIG. 3B shows the absorption property or the sensitivity of a pixel of FIG. 1B, of pixels of two types used in a dual-wavelength thermal infrared sensor according to one example;

FIG. 4 is a table that indicates the wavelengths of infrared rays absorbed in a dual-wavelength thermal infrared sensor according to one example, due to an optical interference that occurs between a metal thin film on an eave and a perfect reflection film and an optical interference that occurs between a metal thin film on a diaphragm and a perfect reflection film;

EXEMPLARY EMBODIMENT

Figure 1A:
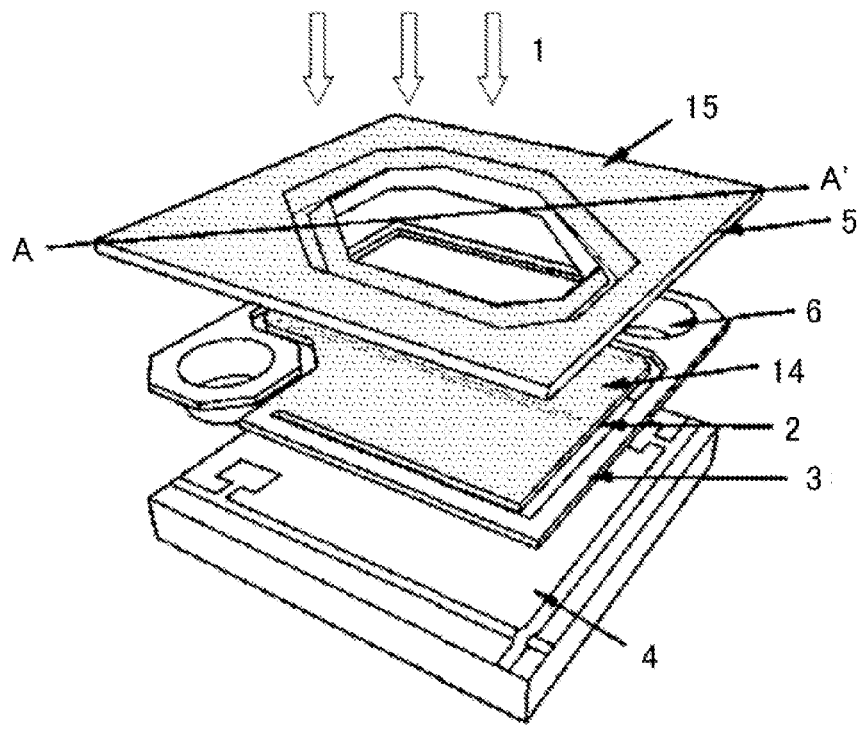
FIG. 1A is an exemplary perspective exploded diagram of a pixel of a first type, of pixels of two types used in a dual-wavelength thermal infrared sensor according to one example of the present invention.

The problems of the examples described in Japanese Patent No. 3597069 will be described as follows.

The problem of the first example is that the pixel of the section A-A' and the pixel of the section B-B', which have protective films that are made of different materials, require a complicated manufacturing process and tend to get different stresses. Therefore, the diaphragms might possibly not be separate from the perfect reflection film when formed, leading to a lower yield ratio.

The problem of the second example is that the pixel of the section A-A' and the pixel of the section B-B', which have different cavity lengths, require a complicated manufacturing process and the yield ratio might be lowered. This is because the Si readout integrated circuit substrate has to be stepped and a sacrifice layer formed on the substrate has to be planarized.

The problem of the third example is that the pixel of the section A-A' and the pixel of the section B-B', which have different protective film thicknesses, require a complicated manufacturing process and tend to get different stresses. Hence, the diaphragms might possibly not be separate from the Si readout integrated circuit substrate when formed, leading to a lower yield ratio.

The problem of the fourth example is that the pixel of the section A-A' and the pixel of the section B-B', which have protective films that are made of different materials and have different thicknesses, require a complicated manufacturing process and tend to get different stresses. Hence, the diaphragms might possibly not be separate from the Si readout integrated circuit substrate when formed, leading to a lower yield ratio.

As can be understood, the dual-wavelength thermal infrared array sensor described in Japanese Patent No. 3597069 requires two types of pixels to be formed with the use of protective films of different kinds, or requires two types of pixels to be formed with the thickness of the protective films varied, or requires two types of pixels to be formed with the cavity length varied. Hence, the manufacturing process becomes complicated and the tendency for different stresses to occur might possibly not get the diaphragms to be separate from the Si readout integrated circuit substrate or the like when the diaphragms are formed. This leads to a problem that the yield ratio is lowered.

The present invention was made in view of the above problems, and an exemplary object of the present invention is to provide a thermal infrared sensor that can detect infrared rays in two wavelength ranges and that are not subject to different stresses due to the protective films and the cavity length of two types of pixels. A dual-wavelength thermal infrared sensor according to one exemplary embodiment of the present invention will be explained as follows.

A dual-wavelength thermal infrared sensor according to the present invention refers to a thermal infrared sensor that includes two or more types of infrared detecting elements each having sensitivity to infrared rays in a range different from the ranges sensed by the other elements. That is, the dual-wavelength thermal infrared sensor according to the present invention covers not only a thermal infrared sensor that detects infrared rays in two ranges, but also a thermal infrared sensor that detects wavelengths in a plurality of (two or more) ranges.

Each pixel that is of a first type has a diaphragm that is supported by a plurality of beams such that the diaphragm has a gap from the Si readout integrated circuit substrate. The diaphragm is formed of a thermoelectric conversion material thin film such as a bolometer material thin film that is almost (substantially) transmissive to infrared rays, an electrode that catches a change of a physicality (e.g., a change of the resistance) of the thin film, and protective films that enclose the thermoelectric conversion material thin film and the electrode. A perfect reflection film that almost (substantially) reflects infrared rays is formed on the Si readout integrated circuit substrate immediately beneath the diaphragm. To increase the fill factor and raise the sensitivity, an eave is formed to spread outward from the diaphragm. The eave is made of the same material as that of the protective films. The material of the protective films is, for example, SiN, and shows an absorption property in a wavelength range of 8 to 14 μm, but hardly absorb infrared rays having a wavelength of 8 μm or shorter (U.S. Pat. Re. 36706). The interval between the upper surfaces of the diaphragm and the perfect reflection film, and between the upper surfaces of the eave and the perfect reflection film are set such that an optical interference occurs in a predetermined wavelength range (e.g., a wavelength range of 3 to 5 μm). A metal thin film is further formed on the diaphragm and the eave.

Meanwhile, a pixel of a second type has a diaphragm and an eave that are of the same configuration as the first type, but has no metal thin film formed on the diaphragm and the eave.

With the configuration described above, a pixel of the former type has sensitivity to a wavelength range of 8 to 14 μm, and sensitivity to another wavelength range (e.g., a wavelength range of 3 to 5 μm) in addition. On the other hand, a pixel of the latter type has sensitivity to mainly a wavelength range of 8 to 14 μm. This is because the SiN thin films hardly absorb infrared rays having a wavelength of 8 μm or shorter, and an optical interference occurs between the metal thin film formed on the diaphragm and the eave and the perfect reflection film. The sensor internally has pixels of these two types disposed in a row-by-row arrangement, a column-by-column arrangement or a staggered arrangement. By calculating signals from the pixels of the two types, the sensor can form images of the wavelength range of 3 to 5 μm and of the wavelength range of 8 to 14 μm separately.

Example

Figure 1B:
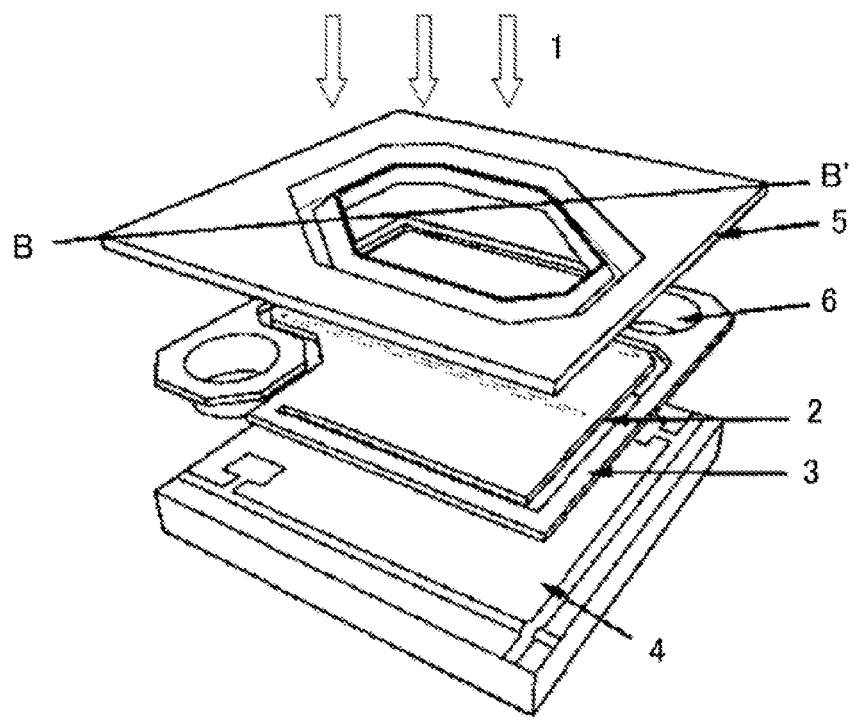
FIG. 1B is an exemplary perspective exploded diagram of a pixel of a second type, of pixels of two types used in a dual-wavelength thermal infrared sensor according to one example of the present invention.
Figure 2A:
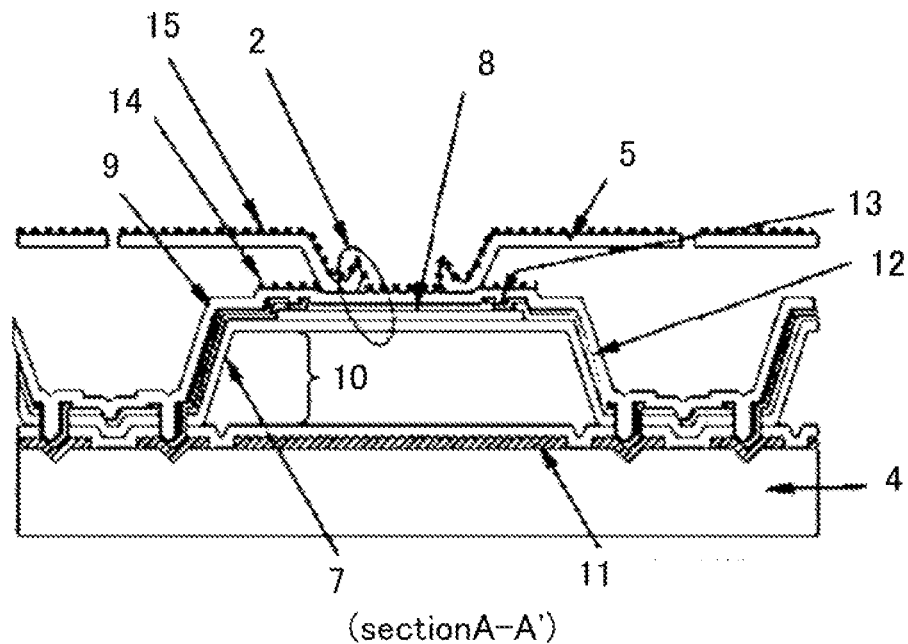
FIG. 2A is an exemplary partial cross sectional diagram taken along A-A' of FIG. 1A.
Figure 2B:
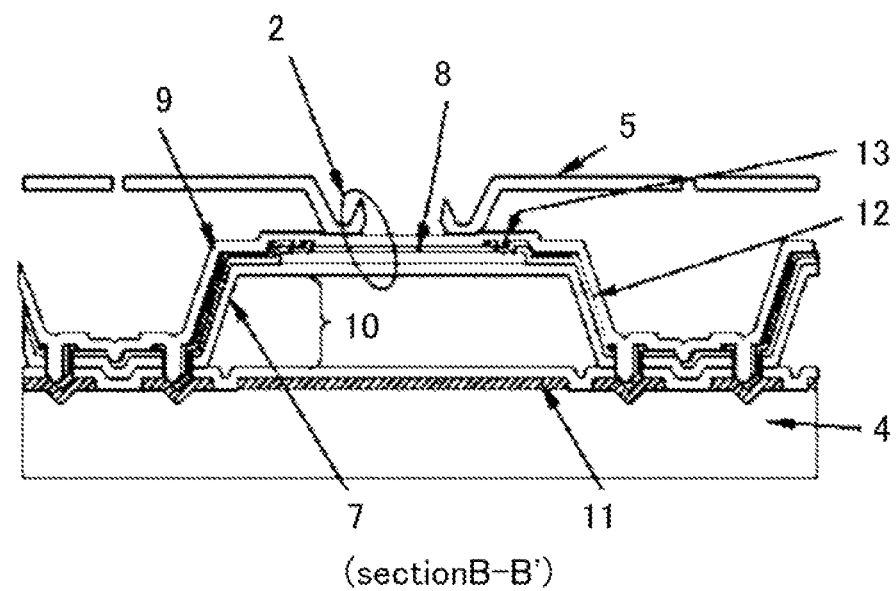
FIG. 2B is an exemplary partial cross sectional diagram taken along B-B' of FIG. 1B.
Figure 5:
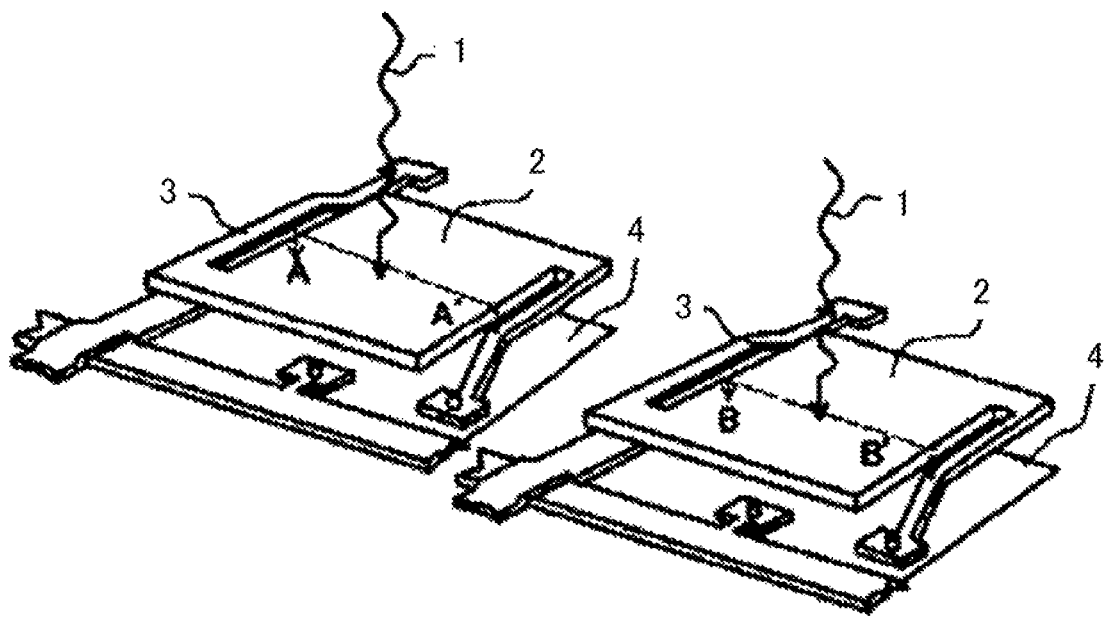
FIG. 5 is an exemplary perspective diagram of a dual-wavelength uncooled thermal infrared array sensor described in Japanese Patent No. 3597069.
Figure 6:
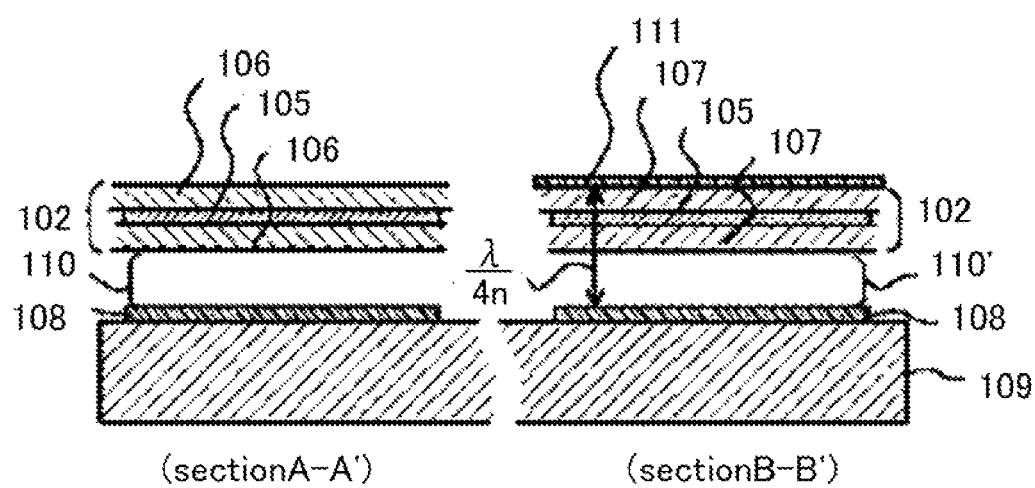
FIG. 6 is an exemplary partial cross sectional diagram of a first example of the dual-wavelength uncooled thermal infrared array sensor described in Japanese Patent No. 3597069.

A dual-wavelength thermal infrared sensor according to one example of the embodiment of the present invention described above will be explained with reference to FIG. 1A to FIG. 4. FIGS. 1A and 1B are exemplary perspective exploded diagrams of pixels of two types used in the dual-wavelength thermal infrared sensor according to the present example. FIG. 2A is an exemplary partial cross sectional diagram taken along A-A' of FIG. 1A, which shows one of the two types of pixels used in the dual-wavelength thermal infrared sensor according to the present example. FIG. 2B is an exemplary partial cross sectional diagram taken along B-B' of FIG. 1B, which shows the other of the two types of pixels.

As shown in FIG. 1A and FIG. 2A, a pixel of a first type includes an upper layer member having a thermal insulation structure constituted by a diaphragm 2, a metal thin film 14, an eave 5, and a metal thin film 15, beams 3, and a Si readout integrated circuit substrate 4. The beams 3 extend from a contact 6 of the Si readout integrated circuit substrate 4. The diaphragm 2 is spatially distanced from the Si readout integrated circuit substrate 4 by a cavity 10, and supported by the beams 3. The metal thin film 14 is formed on the diaphragm 2. The eave 5 is formed to spread outward from the diaphragm 2 on which the metal thin film 14 is formed. The metal thin film 15 is formed on the eave 5. The Si readout integrated circuit substrate 4 has a readout integrated circuit and a perfect reflection film 11. The diaphragm 2 has a multilayer structure formed of a protective film 7, a bolometer material thin film 8, an electrode 13, and a protective film 9. The beams 3 are formed of the protective film 7, an electric wiring 12, and the protective film 9.

A pixel of a second type includes an upper layer member having a thermal insulation structure constituted by a diaphragm 2 and an eave 5, beams 3, and a Si readout integrated circuit substrate 4. The beams 3 extend from a contact 6 of the Si readout integrated circuit substrate 4. The diaphragm 2 is spatially distanced from the Si readout integrated circuit substrate 4 by a cavity 10, and supported by the beams 3. The eave 5 is formed to spread outward from the diaphragm 2. The Si readout integrated circuit substrate 4 has a readout integrated circuit and a perfect reflection film 11. The diaphragm 2 has a multilayer structure formed of a protective film 7, a bolometer material thin film 8, an electrode 13, and a protective film 9. The beams 3 are formed of the protective film 7, an electric wiring 12, and the protective film 9.

Pixels of these two types are disposed in a staggered arrangement, or row by row, or column by column to form a dual-wavelength thermal infrared sensor.

The sensitivities of the pixels of these two types show different absorption properties. A specific explanation will be given below by taking as an example a dual-wavelength thermal infrared array sensor having 640×480 pixels and a pixel pitch of 23.5 μm.

First, a pixel of the second type shown in FIG. 1B, i.e., a pixel shown in FIG. 2B will be explained. The diaphragm 2 of this pixel is formed of a bolometer material thin film 8 made of, for example, vanadium oxide that is almost transmissive to infrared rays (and having a thickness of, for example, approximately 100 nm), a protective film 7, and a protective film 9. An eave 5 that is made of the same material as the protective films (and has a thickness of approximately 300 nm) is formed on the diaphragm. The material of the protective film 7 and the protective film 9 is SiN film (having a thickness of approximately 500 nm in total) or the like, and absorbs infrared rays in a wavelength range of 8 to 14 μm. The perfect reflection film 11 (for example, a metal film made of Al, Ti, WSi, or the like and having a thickness of 200 nm) on the Si readout integrated circuit substrate 4 reflects an incident infrared ray 1 toward the diaphragm 2, and a high infrared absorption rate is thus achieved. The absorption property or the sensitivity of this pixel is shown in FIG. 3B. Since SiN has a very small absorption coefficient for a wavelength of 8 μm or shorter, the pixel is not very sensitive to these wavelengths.

A pixel of the first type shown in FIG. 1A, i.e., a pixel shown in FIG. 2A will be explained as follows. The point that makes the pixel of the first type different from the pixel of the second type described above is that a metal thin film 14 and a metal thin film 15 are formed on the top of the diaphragm 2 and the eave 5 respectively. The material of both the metal thin films is TiAlV or the like, and has a thickness of approximately 20 nm and a sheet resistance of 100 ohm/square. As shown in FIG. 3A, this pixel shows an absorption property or sensitivity to also infrared rays in a wavelength range of 3 to 5 μm. This pixel has sensitivity to infrared rays in a wavelength range of 8 to 14 μm for the same reason as the pixel of the second type described above.

The reason this pixel has sensitivity to infrared rays in the wavelength range of 3 to 5 μm will be explained. As mentioned above, SiN hardly absorb infrared rays having a wavelength of 8 μm or shorter. In this case, an optical interference occurs between the metal thin film 14 formed on the diaphragm and the perfect reflection film 11 or between the metal film 15 formed on the eave 5 and the perfect reflection film 11. As also described in Japanese Patent No. 3597069, the optical distance d between the perfect reflection film 11 and the metal thin film and a wavelength λ that is absorbed due to an interference have a relationship of $d=m\cdot\lambda/4$ (where an order $m=1, 2, \ldots$).

Figure 7:
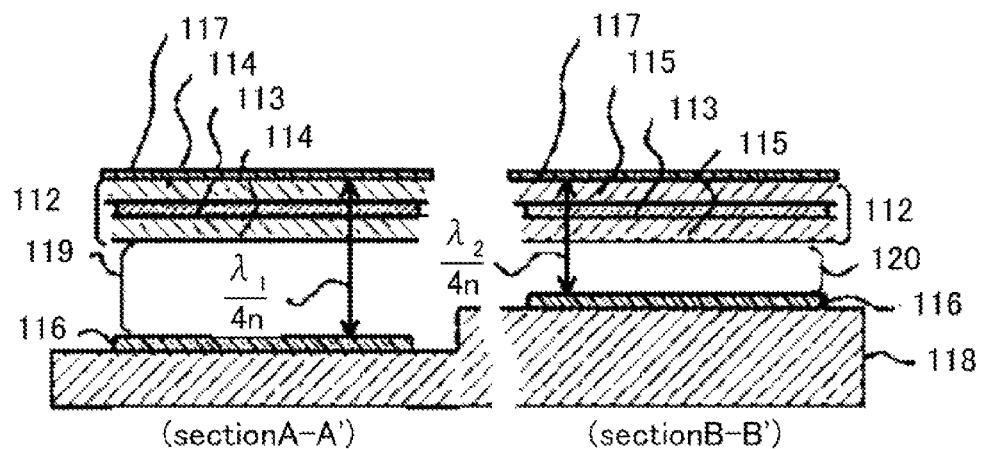
FIG. 7 is an exemplary partial cross sectional diagram of a second example of the dual-wavelength uncooled thermal infrared array sensor described in Japanese Patent No. 3597069.
Figure 8:
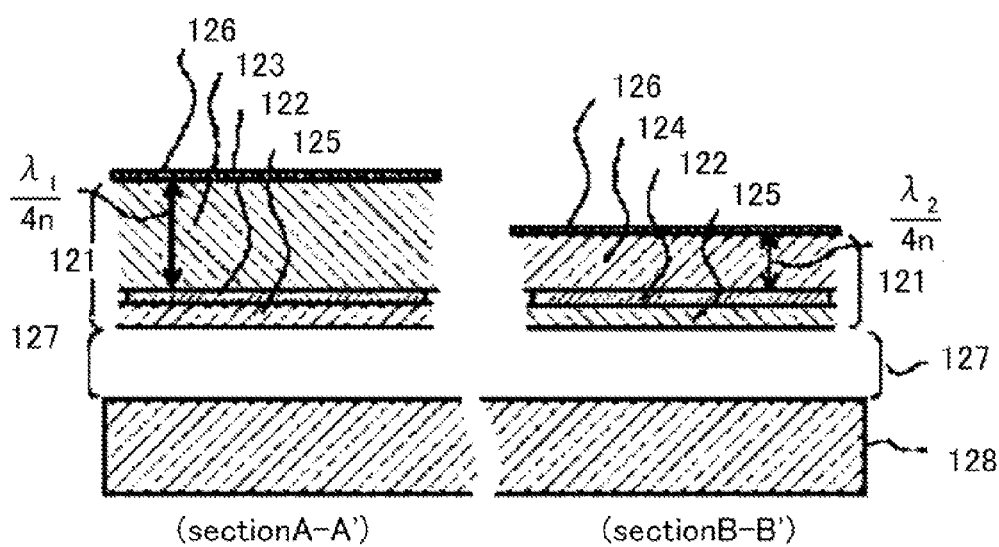
FIG. 8 is an exemplary partial cross sectional diagram of a third example of the dual-wavelength uncooled thermal infrared array sensor described in Japanese Patent No. 3597069.
Figure 9:
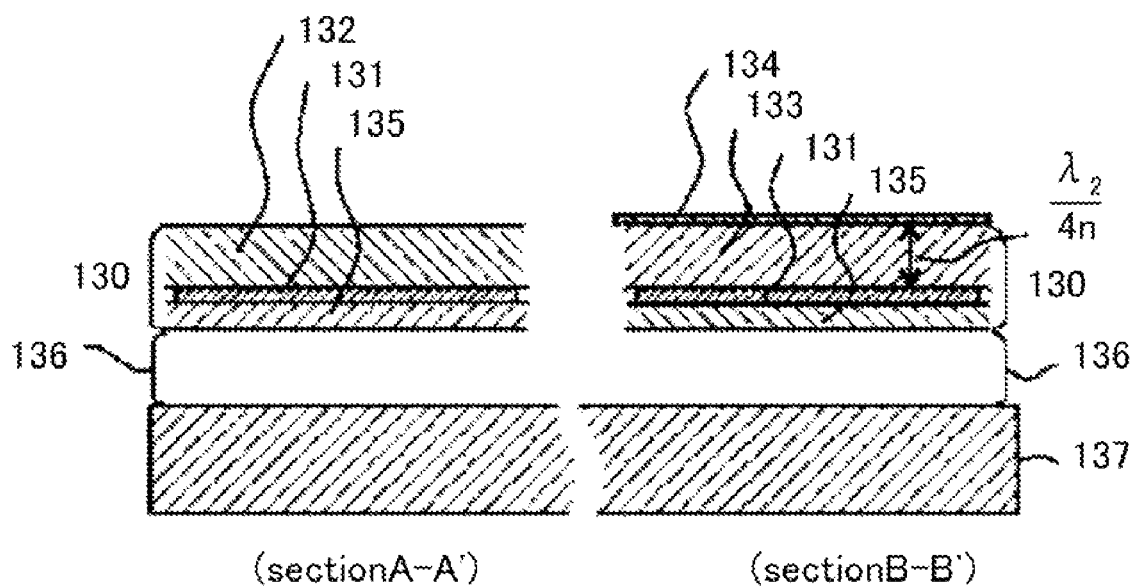
FIG. 9 is an exemplary partial cross sectional diagram of a fourth example of the dual-wavelength uncooled thermal infrared array sensor described in Japanese Patent No. 3597069.

Taking into consideration the refractive index of 1.9 of SiN (calculated based on the reflectance data shown in FIG. 7 of U.S. Pat. Re. 36706), the thickness of 500 nm of the protective films, and the cavity length of 1.3 μm, the optical distance between the metal thin film 14 on the diaphragm 2 and the perfect reflection film 11 is 2.25 μm. On the other hand, when taking into consideration the interval of 1.7 μm between the upper surface of the diaphragm 2 and the lower surface of the eave 5, and the thickness of 300 nm of SiN that makes the eave 5, the optical distance between the metal thin film 15 on the eave 5 and the perfect reflection film 11 is 4.5 μm.

Accordingly, due to an optical interference that occurs between the metal thin film 15 on the eave 5 and the perfect reflection film 11, infrared rays having the wavelengths λ1 shown in FIG. 4 are mainly absorbed by the metal thin film 15. Further, due to an optical interference that occurs between the metal thin film 14 on the diaphragm 2 and the perfect reflection film 11, infrared rays having the wavelengths λ2 shown in FIG. 4 are mainly absorbed by the metal thin film 14. As can be understood from comparison between the two types, forming the metal thin films on the top of the diaphragm 2 and eaves 5 results in infrared rays in a wavelength range of 6 μm or shorter being absorbed by these metal thin films. It is possible to further increase the absorptance of the metal thin films to infrared rays having a wavelength of 6 μm or shorter, by bringing the sheet resistance of the films close to a value of 377 ohm/square, which is obtained by impedance-matching the sheet resistance of the metal thin films to the vacuum.

As described above, with the use of SiN as the protective films, pixels of the first type can utilize the wavelength absorption range of SiN of 8 to 14 μm and show sensitivity to this wavelength range. Furthermore, with the metal thin films formed on the diaphragm and the eave, pixels of the first type can show sensitivity to also infrared rays having a wavelength of 6 μm or shorter, by taking advantage of the fact that infrared rays having a wavelength of 8 μm or shorter almost pass SiN, and of an optical interference that occurs between the metal thin films and the perfect reflection film.

When pixels of the first type and pixels of the second type having such a configuration are disposed in a staggered arrangement, row by row, or column by column in the pixel count of 640×480, it is possible to obtain an image of a wavelength range of 6 μm or shorter by multiplying signals output by the pixels of the second type by a given coefficient k and subtracting the product from signals output by the pixels of the first type. Meanwhile, it is possible to obtain an image of a wavelength range of 8 to 14 μm by simply using signals output by the pixels of the second type. Hence, an image obtained by a dual-wavelength thermal infrared array sensor will be an image of a pixel count of 320×240.

Lastly, how to calibrate the coefficient k will be described. Suppose a case where a thermal infrared array sensor having 640×480 pixels and a pixel pitch of 23.5 μm has pixels of the first type and pixels of the second type disposed in a staggered arrangement, row by row, or column by column. In this case, in order for an image of a wavelength of 6 μm or shorter to be obtained, a filter that transmits infrared rays having a wavelength of 8 μm or longer but blocks infrared rays having a wavelength shorter than 8 μm is placed in front of the array sensor, such that the coefficient k by which signals output by the pixels of the second type are multiplied is determined in a manner that signals obtained from the pixels of the first type and signals obtained from the pixels of the second type become the same. Next, the filter is removed, and an image obtained by multiplying signals output by the pixels of the second type by the coefficient k is subtracted from an image obtained from the pixels of the first type. As a result, an image of a wavelength of 6 μm or shorter can be extracted.

In this way, images of two wavelengths, each of which amounts to the pixel count of 320×240, can be obtained from image data of a thermal infrared array sensor having 640×480 pixels.

As described above, the dual-wavelength thermal infrared sensor according to the present embodiment has the pixels of the two types formed of protective films of the same kind and the same thickness, and with the same cavity length. Further, the sensor has the pixels of one type detect infrared rays in varied wavelength ranges, with these pixels having metal thin films on their diaphragm and eaves. That is, the dual-wavelength thermal infrared sensor according to the present embodiment can detect infrared rays in two wavelength ranges with a simple configuration. Accordingly, the pixels of the two types do not easily get different stresses to occur and the pixels can be less uneven among them, which will lead to a higher yield ratio.

The example described above has shown a case where SiN is used as the material of the protective film 7 and the protective film 9. However, these films may be made of any material that has a relatively larger absorption coefficient for a specific wavelength range (for example, a wavelength range of 8 to 14 μm) and a relatively smaller absorption coefficient for any other wavelength range (for example, a wavelength range of 3 to 5 μm), and a different material may be used for these films. In this case, the kind of the material, the film thickness, and the cavity dimension may be set such that the optical distance between the metal thin film 14 on the diaphragm 2 and the perfect reflection film 11 and the optical distance between the metal thin film 15 on the eave 5 and the perfect reflection film 11 may be desired values.

Further, in the example described above, the thermal infrared sensor is formed of pixels of the first type and pixels of the second type. However, the thermal infrared sensor according to the present invention may be formed of pixels of plural types that detect infrared rays in different wavelength ranges. For example, it is possible to make the sensor capable of detecting three wavelength ranges, by changing the wavelength range defined by an optical interference that occurs between the metal thin film 14 on the diaphragm and the perfect reflection film 11 and the wavelength range defined by an optical interference that occurs between the metal thin film 15 on the eave and the perfect reflection film 11.

Furthermore, in the example described above, a bolometer material thin film is used as the thermoelectric conversion material. However, the present invention is not limited to the example described above, but can be likewise applied to a case where a ferroelectric material thin film is used as the thermoelectric conversion material.

Other than these, preferred modifications of the present invention include the followings.

Preferably, the thermoelectric conversion material thin film is a bolometer material thin film, and the change of the physicality mentioned above is a change of the resistance.

Preferably, the first wavelength range mentioned above is a range of 8 to 14 μm, and the second wavelength range mentioned above is an infrared wavelength range of 8 μm or shorter.

Preferably, the material of the protective films and eaves mentioned above is silicon nitride film, and the first wavelength range mentioned above is a range of 8 to 14 μm while the second wavelength range mentioned above is a range of 3 to 5 μm.

Preferably, pixels of the first type mentioned above and pixels of the second type mentioned above are disposed in a staggered arrangement, row by row, or column by column, an image of infrared rays in the first wavelength range mentioned above is obtained from signals output by the pixels of the second type mentioned above, and an image of infrared rays in the second wavelength range mentioned above is obtained from subtraction from signals output by the pixels of the first type mentioned above, of a value obtained by multiplying signals output by the pixels of the second type mentioned above by a predetermined coefficient.

INDUSTRIAL APPLICABILITY

The present invention can be applied to thermal infrared sensors.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A dual-wavelength thermal infrared sensor that has a thermal insulation structure and comprises a plurality of pixels that detect incident infrared rays,
    wherein the plurality of pixels include pixels of a first type and pixels of a second type that detect infrared rays in different wavelength ranges,
    the pixel of the first type and the pixel of the second type each include a diaphragm that is supported by beams extending from a substrate to have a gap from the substrate; an eave that is formed to spread outward from the diaphragm; and a reflection film that substantially reflects infrared rays and exists on the substrate immediately beneath the diaphragm, the diaphragm includes: a thermoelectric conversion material thin film that is substantially transmissive to infrared rays; an electrode that catches a change of a physicality of the thermoelectric conversion material thin film; and protective films that enclose the thermoelectric conversion material thin film and the electrode, and the protective films of the diaphragm and the eave are made of a material that has a relatively large absorption coefficient for infrared rays in a first wavelength range and a relatively small absorption coefficient for infrared rays in a second wavelength range different from the first wavelength range,
    the pixel of the first type further includes metal thin films that are formed on an upper surface of the diaphragm and an upper surface of the eave respectively;
    the pixel of the first type has sensitivity to infrared rays in the first wavelength range that are absorbed by the protective films and the eave, and to infrared rays in the second wavelength range that is defined by an optical interference that occurs between the metal thin films and the reflection film, and
    the pixel of the second type has sensitivity to infrared rays in the first wavelength range that are absorbed by the protective films and the eave.

2. The dual-wavelength thermal infrared sensor according to claim 1, wherein the thermoelectric conversion material thin film is a bolometer material thin film, and the change of the physicality is a change of resistance.

3. The dual-wavelength thermal infrared sensor according to claim 1,
wherein the first wavelength range is a wavelength range of 8 to 14 μm, and the second wavelength range is an infrared wavelength range of 8 μm or shorter.

4. The dual-wavelength thermal infrared sensor according to claim 1,
wherein the material of the protective films and the eave is silicon nitride film, the first wavelength range is a wavelength range of 8 to 14 μm, and the second wavelength range is a wavelength range of 3 to 5 μm.

5. A method for acquiring image, comprising: disposing pixels of a first type and pixels of a second type that detect infrared rays in different wavelength ranges in a staggered arrangement, row by row, or column by column, wherein the pixel of the first type and the pixel of the second type each includes a diaphragm that is supported by beams extending from a substrate to have a gap from the substrate; an eave that is formed to spread outward from the diaphragm; and a reflection film that substantially reflects infrared rays and exists on the substrate immediately beneath the diaphragm, wherein the diaphragm includes: a thermoelectric conversion material thin film that is substantially transmissive to infrared rays; an electrode that catches a change of a physicality of the thermoelectric conversion material thin film; and protective films that enclose the thermoelectric conversion material thin film and the electrode, wherein the protective films of the diaphragm and the eave are made of a material that has a relatively large absorption coefficient for infrared rays in a first wavelength range and a relatively small absorption coefficient for infrared rays in a second wavelength range different from the first wavelength range; forming metal thin films on an upper surface of the diaphragm and an upper surface of the eave respectively of the pixel of the first type; acquiring an image of infrared rays in the first wavelength range from signals output by the pixels of the second type that has sensitivity to infrared rays in the first wavelength range that are absorbed by the protective films and the eave; and subtracting a value obtained by multiplying signals output by the pixels of the second type by a predetermined coefficient from signals output by the pixels of the first type having sensitivity to infrared rays in the first wavelength range that are absorbed by the protective films and the eave, and sensitivity to infrared rays in the second wavelength range that is defined by an optical interference that occurs between the metal thin films and the reflection film.

* * * * *